United States
Roess

[11] 3,750,136
[45] July 31, 1973

[54] SYSTEM FOR CONTROLLING LIGHT PATTERNS WITH A HIGH CONTRAST
[75] Inventor: Dieter Roess, Planegg, Germany
[73] Assignee: Siemens Aktiengesellschaft, Berlin and Munich, Germany
[22] Filed: Feb. 22, 1971
[21] Appl. No.: 117,327

[30] Foreign Application Priority Data
Apr. 13, 1970   Germany.................. P 20 17 615.2

[52] U.S. Cl......... 340/324 R, 340/336, 350/160 LC
[51] Int. Cl................................................ G09f 9/30
[58] Field of Search.................... 340/324 R, 336; 350/160 R, 160 P, 162 SF; 178/30

[56] References Cited
UNITED STATES PATENTS
| | | | |
|---|---|---|---|
| 3,085,469 | 4/1963 | Carlson | 350/162 SF |
| 3,370,268 | 2/1968 | Dobrin et al. | 350/162 SF |
| 3,598,471 | 8/1971 | Baldwin et al. | 350/160 P |
| 3,536,376 | 10/1970 | Henning | 350/162 SF |
| 3,499,112 | 3/1970 | Heilmeier et al. | 340/324 R |
| 3,620,598 | 11/1971 | Brandt | 350/162 SF |

Primary Examiner—John W. Caldwell
Assistant Examiner—Marshall M. Curtis
Attorney—Hill, Sherman, Meroni, Gross & Simpson

[57] ABSTRACT

A system to produce a visual presentation on a screen such as alpha-numeric indications characterized by a switching element which is a matrix of individually controlled liquid crystals, a converging lens system, a plane filter located at the focal point of the lens system, and a screen. The matrix of liquid crystals includes means to render discrete liquid crystals in a condition to diffuse and scatter the light beams being projected therethrough. By selectively rendering specific liquid crystals of the matrix in the scattering condition, a source of parallel light can be converted to a specific pattern which is passed through a convergent lens system, through the plane filter such as an iris or aperture in a partition extending perpendicular to the parallel light beams and projected on a screen to produce the desired indication. Preferably, the source of light is obtained from a laser.

5 Claims, 3 Drawing Figures

PATENTED JUL 31 1973 3,750,136

INVENTOR
Dieter Roess
BY
ATTYS.

SYSTEM FOR CONTROLLING LIGHT PATTERNS WITH A HIGH CONTRAST

BACKGROUND OF THE INVENTION

1. Field of the Invention

The present invention is directed to a system for creating alpha-numeric indicators by selectively blocking portions of a source of parallel light rays.

2. Prior Art

Some organic compounds while in a fluid state display crystal properties such as double refraction or birefringence and will transmit a light beam without scattering. However, these compounds also have a condition in which they will diffuse and scatter a light beam and thus appear opaque or appear to block the passage of a light source therethrough. The compounds can be switched from one state to the other by the application of a magnetic or electrical force. A rather detailed discussion of liquid or fluid crystals is contained in an article by George H. Heilmeier, Lewis A. Zanoni and Lucian A. Barton, "Dynamic Scattering: A New Electro-optic Effect in Certain Classes Nematic Liquid Crystals." *Proceedings of the IEEE*, Published by The Institute of Electrical and Electronics Engineers, Inc., Volume 56, No. 7, July 1968, Pages 1162–1171.

In the above-mentioned article, it is suggested that a matrix of liquid crystals could be utilized in applications to form alphanumeric indications. It has been suggested that by projecting parallel light beams onto a matrix of liquid crystals with each of the crystals being individually controlled, the matrix could be controlled to pass the light beams through particular areas therein while scattering the light beams in the remaining areas so that the light when projected on a screen would produce the desired indication. However, since the liquid crystal always passes any light projected thereon, and depending on its condition either transmits the light in an uninterrupted manner or diffuses or scatters the light to give the appearance of blocking the flow of light therethrough, the diffused or scattered light causes a background illumination of the screen which reduces the contrast between the desired indication on the screen which are the light spots or portions and the dark areas which are created by the scattering of the light beams to cause loss of contrast of the indication. In other words, the dark area on the screen created by scattering the light beams directed thereon receives enough illumination to reduce the contrast between them and the areas receiving the uninterrupted light beams to reduce the contrast of the indication and the background lighting of the screen.

SUMMARY OF THE INVENTION

The present invention is directed to a system for producing selected patterns in a light beam such as providing means to selectively transmit the light beams in a desired area taken along the plane perpendicular to the path of the light beams, filter means to block passage of undesired light rays, and a screen on which the light beams are projected. In the preferred embodiment the means for transmitting the light beams in a particular area is a switching element having a matrix of individually controlled liquid crystals disposed perpendicular to the path of the light beams. The filter means includes a means such as a lens system for converging the light beams that are selectively transmitted by the switching element at a focal point and a plane filter located at the focal point for blocking the light rays not converged to the focal point. The plane filter is preferably a partition having an aperture or means forming an iris.

Accordingly, an object of the present invention is to provide a system for selectively transmitting a light beam to form light patterns such as alphanumeric indications on a screen.

Another object of the present invention is to provide a system for forming light patterns such as alphanumeric indications on a screen with an increased contrast between the indication and the background illumination to enable better recognition of the particular pattern projected thereon.

Other objects, features and advantages of the present invention will be readily apparent from the following description of a preferred embodiment thereof taken in conjunction with the accompanying drawings although variations and modifications may be effected without departing from the spirit and scope of the novel concept of the disclosure.

DESCRIPTION OF THE PREFERRED EMBODIMENTS

Figure 1:
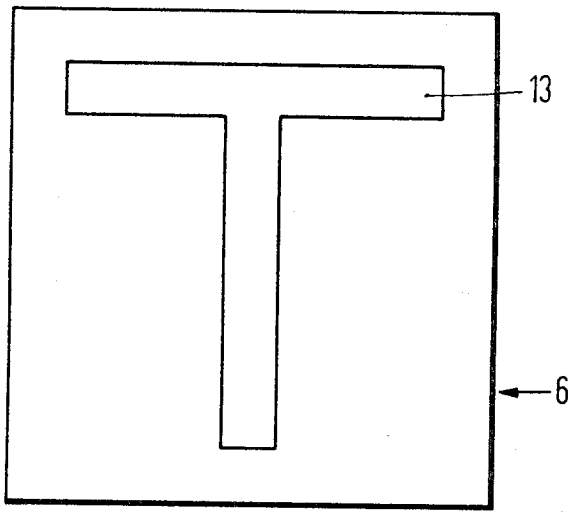
FIG. 1 is a plan view of a screen of an alphanumeric system incorporating the present invention.
Figure 2:
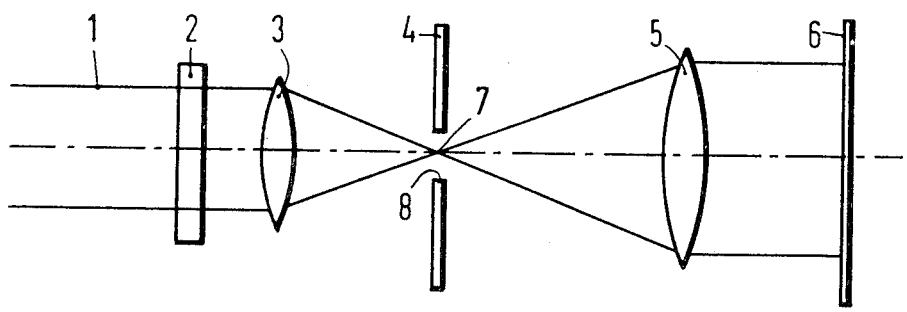
FIG. 2 is a diagrammatic presentation of the present invention.

The principles of the present invention are best illustrated in FIG. 2 in which a beam 1 of parallel light rays is applied as an incident beam on a switching element 2 which is capable of selectively passing the rays of the beam of parallel rays 1 as parallel rays or scattering them into non-parallel rays. The light passing through the switching element 2 is thus directed to a filter means including a means for converging the parallel rays illustrated as a lens 3 and a plane filter 4. The lens 3 is positioned to receive the light rays passing through the switching element 2 and converges the parallel rays to a focal point 7 where the plane filter 4 which is illustrated as a partition having an aperture or means forming an iris 8 therein is located. Once the rays of light focused by the lens 3 pass through the iris 8 of the filter 4, a second lens system or lens means such as a lens 5 is used to convert the diverging rays into parallel rays which are then projected on a screen 6.

The beam of parallel light rays are preferably provided from a laser beam because they have a particularly good parallelity, are monochromatic, and have plane wave fronts which are practically not influenced by defraction. Thus, by use of a laser beam, the converging lens means such as the lens 3 can focus the beams at the focal point 7 with a good concentration and minimal amount of overlap which sharply limits any scattering of the light beams as they pass through the iris 8 of the partition forming the filter 4.

Figure 3:
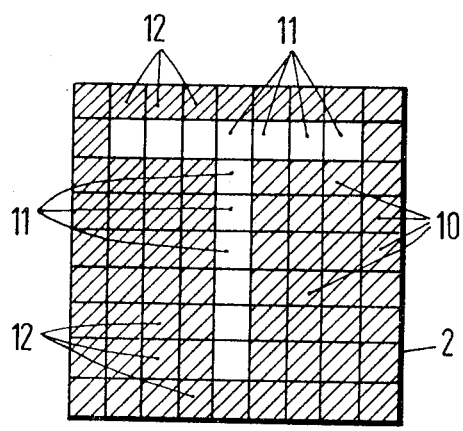
FIG. 3 is a plan view of a matrix of liquid crystals used as a switching element in the present invention.

As illustrated in FIG. 3, a switching element 2 is a matrix of a plurality of liquid crystals 10 in a raster or screen pattern arrangement which crystals have a geometric shape such as the illustrated square configuration in a plane extending perpendicular to the parallel light rays 1. The liquid crystals can have any geometric configuration and each crystal has appropriate electrodes which enable the changing of the crystal from a light-transmitting condition to a light-scattering condition. An example of an organic compound which can be utilized for the liquid crystals is Anisylidene-p-aminophenylacetate. Another example of a compound which will act as a fluid crystal is 4-methoxy-4'-(n-butyl) benzylidene aniline. Various structural arrangements for operative liquid crystals are discussed in the above-mentioned article by George H. Heimmer, Lewis A. Zanoni and Lucien A. Barton, "Dynamic Scattering: A New Electrooptic Effect in Certain Classes of Neumatic Liquid Crystals," *Proceedings of the IEEE*, Published by the Institute Electrical and Electronic Engineers, Inc., Volume 56, No. 7, July 1968 and the disclosure of this article is thereby incorporated by reference thereto.

As illustrated in FIG. 3, a selected number of the liquid crystals 10 which are identified by the numeral 11 are in a condition to transmit the light without any scattering. The remaining crystals 12 of the matrix forming the switching element 2 are in a condition to scatter the light. Thus, parallel light beams are scattered with the unaffected parallel light beams having a pattern in a plane perpendicular to the parallel beams which assume the shape of parallel light-transmitting crystal 11 and as illustrated a T-shape. As a result, after passing through the converging lens 3, the plane filter 4, and the second lens system such as the lens 5, a pattern 13 of light and dark areas with the light areas having a T-shape is projected on the screen 6 to provide the particular indication. By selectively switching each of the liquid crystals between the condition for transmitting light in an unaffected condition and a condition for scattering light, any light pattern such as any letter of the alphabet or any numeral can be produced.

It should be pointed out, however, that each of the crystals 10 is transmitting light regardless of its particular condition, the only difference is whether the light is still in a substantially parallel beam or whether it is being diffused or scattered into divergent pattern characteristics of the scattered condition. Thus, to project the light beams passing through the switching element 2 directly on a screen such as 6, the light passing through the cells 10 that are in a scattering condition create a background illumination on the screen 6 which reduces the contrast between the light area caused by the parallel light beams hitting the screen and the dark area of the screen and causes difficulties for an operator or person to recognize the symbol or figure being produced on the screen 6.

By providing the filter means comprising the lens 3 for converging the parallel light beams into a focal point 7 and a plane filter 4 located at the focal point 7 for the lens, the contrast of the symbol projected on the screen 6 over the background lighting of the dark area on the screen is greatly increased. This is understood by the fact that the lens 3 which can be either a single lens or a plurality of lens of the means for converging or focusing the parallel beams focuses a majority of the parallel beams at the focal point 7. The filter 4 is illustrated as a partition having an aperture or iris 8 so that the light focused to the focal point 7 of the lens 3 passes through the aperture and then is converted back to parallel beams by the second lens system such as lens 5 to be projected on the screen 6. The light, which was scattered by the cells 12 in the scattering condition of the switching element 2, due to the different angles of incidence on the lens 3 will be focused by the lens 3 at a plurality of focal points which are randomly offset from the focal point 7. The filter 4 with the aperture 8 at the focal point 7 of the lens 3 will only allow passage of the light beams which are converged to focal point 7 and blocks the light of the scatter light beams. Thus the filter 4 will reduce the amount of background light from the scattered light waves passing through the crystals which are in a scattering condition and decrease the illumination of the areas which should be dark for a particular indication.

In order to be able to recognize the information projected on the screen 6, which information is fed into the switching element 2 by its control means, the resolving powers of the system are of basic importance. The spectoral function, the Fourier transforms, can be derived from a certain distribution of bright and dark places on the switching element 2, for instance the pattern of parallel light-transmitting crystals as compared to the pattern of defracting crystals. The spacial pictoral components of the information-carrying light beam correspond to the diffraction at the bright-dark interfaces in the switching element. Since these spectoral components are important for recognizability of the information respectively contained in the switching element and superimposed into the light beam, it is necessary to increase the hole diameter of the aperture or iris 8. Thus in selecting the size of the iris 8 for the partition 4, consideration must be given for blocking out the transmission of the scattered light waves, yet the size of the iris should not be so small as to cause defraction of the light beams passing therethrough, or of a size to destroy by diffraction a part of the information-carrying light beams being focused and passed therethrough. Thus the size of this iris is selected to block out a majority of the scattered light waves without causing distortion of the focused parallel light beams carrying the particular information such as the alphanumeric indication.

In selecting the size of the aperture when no information is to be indicated on the screen 6, the aperture is preferably several wave lengths of the light beam 1; however, to provide an information indication, the aperture opening must be essentially larger. It should also be pointed out that no lens is exactly perfect in focusing all parallel rays at a single focal point; therefore, the size of the aperture or iris must also include some tolerance for the tolerance in the focal point of the lens system.

The aperture 8 may be an adjustable iris which is adjusted in order to be able to provide the best reproduction and resolution of the symbols for the particular system arrangement. The opening of the iris, however, is independent of the size of the picture and it has been suggested that the iris be a transparent member which has a gradual transition from a center which is fully permeable to light to impermeable outer area. The use of an adjustable iris or an iris that has a gradual transition from fully permeable to impermeable condition for light enables proper selection of the size of the iris to obtain the correct resolution necessary for proper reading of the figure or symbol. It should be pointed out, that, if the beams passing through the liquid crystals are too sharply focused, they may appear as dots or other geometric configurations on the screen which may cause difficulties in determining the nature of the symbol being projected.

While this discussion has been directed to a matrix of liquid crystals which are used as a switching element, it is possible to use other switching elements which will allow the transmission of parallel light beams in a particular pattern when viewed along a plane extending perpendicular to the light beams.

Although various minor modifications might be suggested by those versed in the art, it should be understood that I wish to embody within the scope of the patent warranted hereon all such modifications that reasonably and properly come within the scope of my contribution to the art.

I claim as my invention:

1. An arrangement for producing a pattern in a beam of directional light rays projecting on a screen to create an image thereon, comprising a screen, a light beam switching element with selectively controllable areas along a plane extending transverse to the axis of said beam for scattering portions of the directional rays of the beam to create a pattern of scatter rays and unscatter rays in the beam, and a filter means disposed between said switch element and said screen for blocking the scatter rays as it passes the unscatter rays to improve the contrast between the image and background illumination on said screen, said filter means consisting of means for converging the unscatter directional rays to a focal point and a plane filter comprising a partition with means forming an iris therein, said plane filter being disposed with the iris means at said focal point and the partition extending transversely to the axis of the beam whereby the filter means reduces background illumination of the screen which is caused by the scattered rays being projected on the screen.

2. An arrangement according to claim 1, characterized in that the switching element is a matrix of individual liquid crystals each of which is selectively controlled between a light-transmitting condition and a light-scattering condition.

3. An arrangement according to claim 1 wherein the means forming an iris is an aperture in the partition.

4. An arrangement according to claim 1 wherein the means forming an iris is a transparent member with a center fully permeable to light surrounded with an outer area impermeable to light.

5. An arrangement according to claim 4, wherein the means forming an iris has an immediate area between the center and outer area to provide a gradual transition from said permeable center to the impermeable outer area.

* * * * *